United States Patent Office 2,921,964
Patented Jan. 19, 1960

2,921,964

PROCESS OF PREPARING VINYL SUBSTITUTED SULPHUR CONTAINING COMPOUNDS

Hugh E. Ramsden, Metuchen, N.J., assignor to Metal & Thermit Corporation, New York, N.Y., a corporation of New Jersey No Drawing. Application November 28, 1955
Serial No. 549,569

4 Claims. (Cl. 260—607)

This invention relates to a process for producing many sulfur, selenium, tellurium and/or oxygen-containing organic compounds and to novel compounds so produced. This application is a continuation-in-part of application Serial Number 520,626, filed July 7, 1955, now abandoned.

More particularly this invention is directed to a process wherein an aryl, heterocyclic or vinyl magnesium chloride compound is caused to react with oxygen, sulfur, selenium, tellurium, sulfur dioxide, thionyl chloride ($SOCl_2$), sulfuryl chloride ($SO_2Cl_2$), sulfonyl chlorides ($RSO_2Cl$), sulfur dichloride and sulfur monochloride to produce phenols, aldehydes, ketones, hydroxy compounds, mercaptans, mercaptides, sulfinic acids, sulfoxides, sulfones, sulfides and disulfides.

The organomagnesium chloride compounds employed in practicing this invention may be described as $$RMgCl \cdot nQ$$

where R is an aryl group, a vinyl group or a heterocyclic group, as more particularly defined below, $n$ is an indeterminate number from 1 to 3 and Q is hereinafter defined. These organomagnesium chloride compounds are made by reacting the corresponding RCl with magnesium in the presence of compound Q as reaction medium. In accordance with this invention, these organomagnesium chloride compounds are reacted with the aforementioned reactants to yield, after further treatment with water or dilute acid, the aforementioned oxygen and/or sulfur-containing products which have use as intermediates for the manufacture of plasticizers, insecticides, perfumes and other products. Some of them, as for example phenyl-p-chlorophenyl sulfone, are themselves useful as insecticides, miticides, acaricides, etc.

Compound Q is a substituted or unsubstituted heterocyclic compound (having 5 or 6 atoms in the ring) containing one oxygen atom in the ring structure; the other ring atoms being carbon with the exception that one nitrogen atom may be substituted for any carbon atom other than those carbon atoms adjacent to the oxygen. The heterocyclic compounds may contain a single unsaturated bond, as in dihydropyran. Compounds within this definition include tetrahydrofuran, tetrahydropyran, 2-methyltetrahydrofuran, 2-ethoxytetrahydropyran, tetrahydrofurfuryl ethyl ether, dihydropyran, dibenzofuran and N-methylmorpholine. Permissible substitutions being groups which are not reactive with organomagnesium chlorides, or with any of the other components and products of the reaction mixtures of the present process, and includes substituted and unsubstituted alkyl, aryl, alkoxy and aryloxy groups (all allowable substitutes being those unreactive to other components of the reaction mixture as specified hereinbefore). Where nitrogen replaces a carbon atom, hydrogen on the nitrogen atom must be substituted with a group unreactive to the reactants or reaction products. A further requirement for Q is that the oxygen must be available for electron donation, i.e., the free p-electrons present on the oxygen should be available for coordination with the organomagnesium chloride. Any large blocking groups in the 2 and 5 (6) position may restrict the availability of these electrons. Another way these electrons may be restricted in their availability is by p-pi resonance, as for example in furan, which is not operative. One double bond giving p-pi resonance, as in dihydropyran (which is operative) allows reactivity since the oxygen still has free p-electrons. Expressed in another fashion, the oxygen of the heterocyclic ring structure must be such that electrons of the oxygen atom are available for coordination and complex formation with magnesium. Since Q also apparently functions as a solvent, a Q which has a high melting point may still function in this invention, but if it is used as solvent, obviously the high melting point (e.g., above 90° C.) causes great difficulty in carrying out the reaction. Any liquid Q of any structure whatsoever (with the limitations specified hereinbefore) will work.

The compound Q, employed to promote reaction and to form a complex with the vinyl, heterocyclic or aryl magnesium chloride may be a simple 5 or 6 member heterocyclic compound containing one oxygen in the ring and having the requisite characteristics set forth above, e.g., tetrahydrofuran, tetrahydropyran, dihydropyran, etc. It may also be a 5 or 6 member heterocyclic compound containing one oxygen in the ring and further substituted by monovalent groups and having said characteristics, e.g., 2-methyltetrahydrofuran, 2-ethoxytetrahydrofuran, tetrahydrofurfuryl ethyl ether, N-methyl morpholine, etc. Furthermore, the compound Q may be a 5 or 6 member heterocyclic compound having one oxygen atom in the ring and substituted by polyvalent radicals to form fused ring compounds, providing that the compound has the necessary characteristics set forth above in the definition of compound Q, e.g., dibenzofuran, etc.

The process may be carried out in the compound Q, as reaction medium, preferably at a temperature between room temperature and the reflux temperature. However, the temperature is not critical and may be even lower than room temperature. Inert hydrocarbon solvents may also be used as the reaction medium in place of compound Q. When the reaction between the oxygen, sulfur, selenium, tellurium, sulfur dioxide, thionyl chloride, sulfuryl chloride, sulfonyl chloride, sulfur dichloride or sulfur monochloride and the organomagnesium chloride compound is completed, cold water or dilute acid is added carefully and the resulting product is recovered by distillation or otherwise. The sequence of reactions in the case of oxygen and sulfur is illustrated by the following general equations:

(1) $RMgCl \cdot nQ + S \rightarrow RSMgCl + nQ$
(1A) $RSMgCl + H_2O \rightarrow RSH + MgClOH$
(2) $RMgCl \cdot nQ + O_2 \rightarrow ROMgCl + nQ$
(2A) $ROMgCl + H_2O \rightarrow ROH + MgClOH$ wherein R is an organic radical which may be more specifically defined in what follows. Elemental selenium or tellurium may replace sulfur in Equations 1 and 1A.

ARYLMAGNESIUM CHLORIDE REAGENTS (A) *Reactions with sulfur and oxygen.*—The reactions of arylmagnesium chloride reagents, $RMgCl \cdot nQ$, as defined below, with sulfur and oxygen to produce desirable phenols and thiophenols in accordance with this invention may be illustrated by the following over-all equations, which includes the hydrolysis step (Equations 1A and 2A above):

(3) $RMgCl \cdot nQ + S \longrightarrow RSMgCl \xrightarrow{H_2O} RSH + nQ$ (4) $RMgCl \cdot nQ + O_2 \longrightarrow ROMgCl \xrightarrow{H_2O} ROH + nQ$ wherein n is a small whole number, and R is defined as

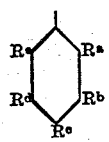

wherein $R^a$, $R^b$, $R^c$, $R^d$ and $R^e$ may be the same or different substituents as long as they do not react with the arylmagnesium chloride reagent. They may be hydrogen; fluorine, chlorine; alkyl, such as methyl, ethyl, etc., alkenyl, such as vinyl, allyl, propenyl, etc.; aryl, such as phenyl, tolyl, xylyl, xenyl, etc.; aralkyl, such as benzyl, phenylethyl, cinnamyl, methylbenzyl, etc.; heterocyclic, such as thienyl, thenyl, furyl, etc.; alkoxy, such as methoxy, ethoxy; allyloxy, etc.; aryloxy, such as phenoxy, tolyloxy, xenyloxy, etc.; and dialkylamino, such as dimethylamino, diethylamino, etc. groups.

Elemental selenium or tellurium may replace sulfur in Equation 3.

Chlorophenyl and substituted chlorophenylmagnesium chlorides react with sulfur and oxygen according to Reactions 3 and 4, wherein R is defined in this case as:

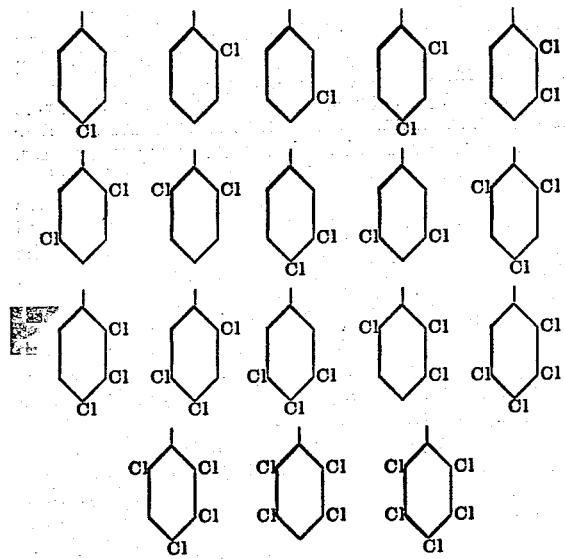

In the above radicals any position not containing chlorine may be filled with fluorine or any organic monovalent group such as alkyl, alkenyl, aryl, dialkylamino, alkoxy, aryloxy and alkenyloxy groups. In addition, divalent groups such as alkylidene dioxy groups may join to adjacent open positions. The substituents may contain functional groups if these are not reactive to the aryl magnesium chloride reagent.

Xenylmagnesium chlorides will react with sulfur and oxygen according to Reactions 3 and 4.

R may be defined in these reactions as xenyl radical, substituted or unsubstituted. The raw materials for preparing the RMgCl by the compound Q process might also contain some chlorinated terphenyls. Thus R may be:

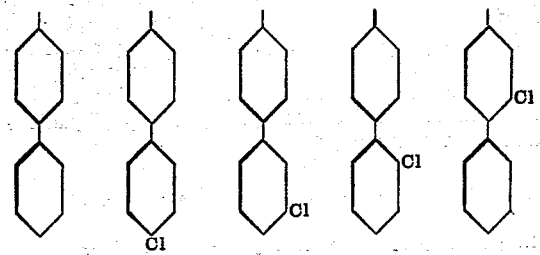

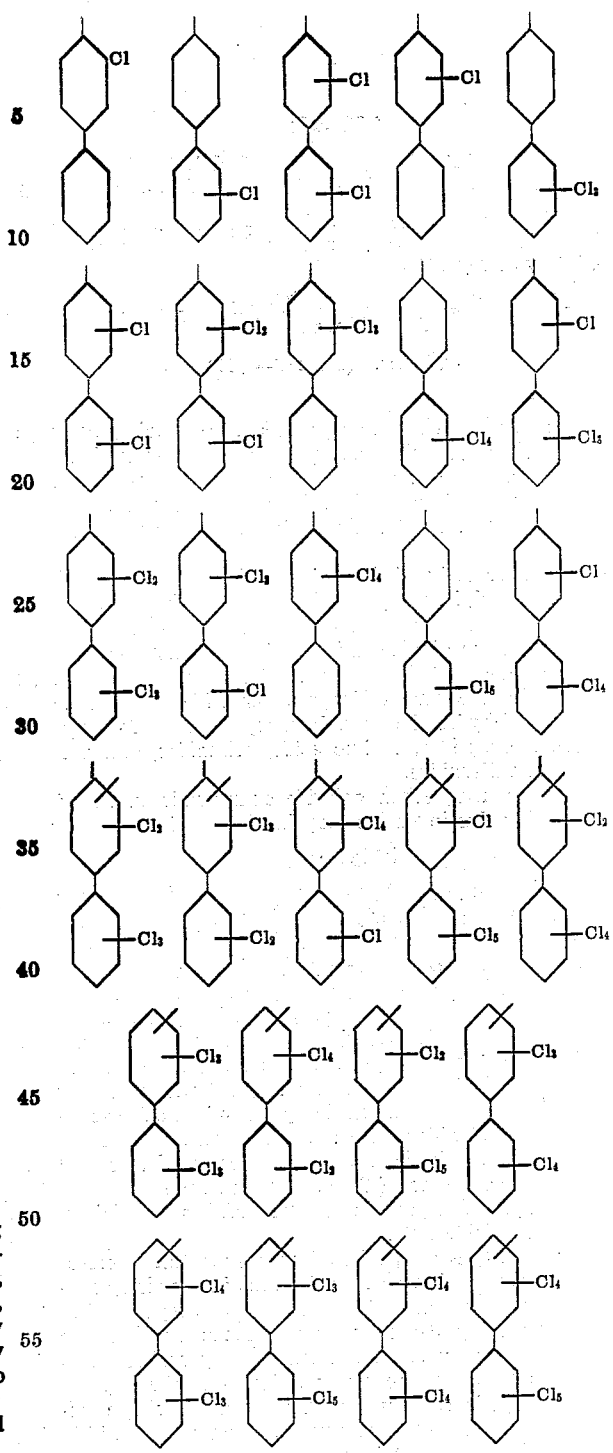

The bond to the magnesium may be ortho, meta or para. Other groups may be present instead of ring hydrogen, including alkyl, alkenyl, aryl, alkaryl, aralkyl, fluorine, alkoxy, alkenoxy, aryloxy, dialkylamino, etc. groups.

Bifunctional arylene di(magnesium chloride) reagents may also be used with sulfur and oxygen according to the following reactions:

(5) 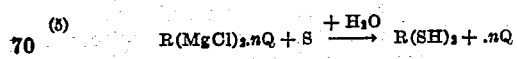

(6) 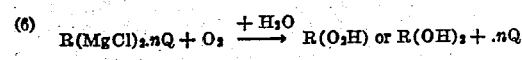

Elemental selenium or tellurium may replace sulfur in Equation 5.

In the foregoing bifunctional arylene di(magnesium chloride) reactions R(MgCl)$_2$ may be in general:

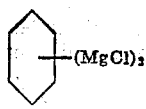

where the hydrogens on the ring may be replaced by any group not reactive to RMgCl, such as chlorine, fluorine, R'$_2$N—, R'O—, R', etc., and where R' is a monovalent organic radical. Two neighboring R' radicals may be cyclicized.

R(MgCl)$_2$ may also be:

where hydrogen may be replaced as above;

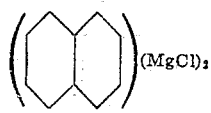

where hydrogen may be replaced as above;

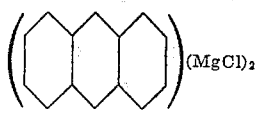

where hydrogen may be replaced as above;

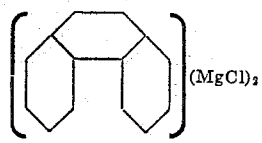

where hydrogen may be replaced as above;

or R may be any other bivalent group where the bonds from carbon to magnesium are those of aromatic carbon to magnesium, where hydrogen may be replaced as described above.

(B) *Reactions with sulfur dioxide, sulfur, (SOCl$_2$) thionyl chloride, (SO$_2$Cl$_2$) sulfuryl chloride, (R'SO$_2$Cl) sulfonyl chlorides, (SCl$_2$) sulfur dichloride, and (S$_2$Cl$_2$) sulfur monochloride.*—Aryl, chlorophenyl, and xenyl magnesium chloride compounds, RMgCl·nQ, as defined above, react with sulfur dioxide, thionyl chloride, sulfuryl chloride, sulfonyl chlorides, sulfur dichloride and sulfur monochloride generally, according to the following reactions:

(7) RMgCl·nQ + SO$_2$ ⟶ RSO$_2$MgCl ⟶ RSO$_2$H + ·nQ (8) RMgCl·nQ + SOCl$_2$ ⟶ RSOCl $\xrightarrow{\text{RMgCl·nQ}}$ RSOR + ·nQ (9) RMgCl·nQ + SO$_2$Cl$_2$ ⟶ RSO$_2$Cl $\xrightarrow{\text{RMgCl·nQ}}$ RSO$_2$R + ·nQ

(10) RMgCl·nQ + R'SO$_2$Cl $\xrightarrow{\text{RMgCl·nQ}}$ R'SO$_2$R + ·nQ

(11) RMgCl·nQ + SCl$_2$ ⟶ RSCl $\xrightarrow{\text{RMgCl·nQ}}$ RSR + ·nQ

(12) RMgCl·nQ + S$_2$Cl$_2$ ⟶ RS$_2$R + ·nQ

(13) 

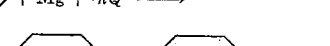 + ·nQ an insecticide and miticide

(14) 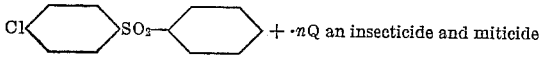

wherein R' is a monovalent organic radical inert to RMgCl·nQ and R is the same as defined for Reactions 3 and 4 when R is aryl; chlorophenyl and substituted chlorophenyl; and xenyl, respectively.

Bifunctional arylene di(magnesium chloride) compounds R(MgCl)$_2$·nQ, as those defined for Reactions 5 and 6 perform similarly with sulfur dioxide, sulfur oxychloride, sulfuryl chloride, sulfonyl chlorides, sulfur dichloride and sulfur monochloride according to the following:

(15) R(MgCl)$_2$·nQ + SO$_2$ ⟶ R(SO$_2$MgCl)$_2$ $\xrightarrow{+H_2O}$ R(SO$_2$H)$_2$ + ·nQ

(16) R(MgCl)$_2$·nQ + SOCl$_2$ ⟶ R(SOCl)$_2$ $\xrightarrow{\text{RMgCl·nQ}}$ R(SOR—)$_2$ + ·nQ

(17) R(MgCl)$_2$·nQ + SO$_2$Cl$_2$ ⟶ R(SO$_2$Cl)$_2$ $\xrightarrow{\text{RMgCl·nQ}}$ R(SO$_2$R—)$_2$ + ·nQ

(18) R(MgCl)$_2$·nQ+R'SO$_2$Cl→R(R'SO$_2$)$_2$+·nQ

(19) R(MgCl)$_2$·nQ+SCl$_2$→RS+·nQ

(20) R(MgCl$_2$·nQ+S$_2$Cl$_2$→R$_2$S$_2$+·nQ wherein R' is a monovalent organic radical inert to R(MgCl)$_2$·nQ.

HETEROCYCLIC MAGNESIUM CHLORIDE REAGENTS (A) *Reactions with sulfur and oxygen.*—Heterocyclic magnesium chloride reagents, RMgCl·nQ, as defined below, react with sulfur and oxygen generally according to Reactions 3 and 4 and also the following reactions:

(21) 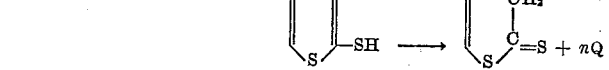

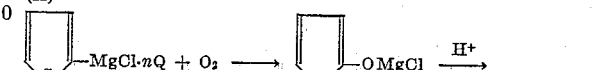

(22) 

(23) 

(24) 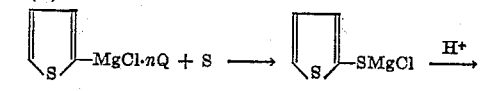

wherein n is a small whole number, Q is a substituted or unsubstituted cyclic tetra- or pentamethylene oxide as previously defined, and R is a radical which includes in its structure an oxygen, sulfur or tertiary nitrogen heterocycle, its bond magnesium being through a carbon of an aromatic or pseudoaromatic ring.

Elemental selium or tellurium may replace sulfur in Equations 21 and 23.

Among the types of heterocyclic groups, R, which may be employed in reactions such as Nos. 3, 4 and 21 through 24, are those shown in the following structural formulas in which a free bond indicates the point of attachment of the MgCl group except that when two free bonds are shown in one structure they represent alternative points of attachment. In these structures any or all hydrogens in the molecules may be replaced by fluorine, chlorine, alkyl, alkenyl, aryl, alkoxy, aryloxy or other groups not reactive to RMgCl. Two adjacent substituents may be linked or cyclized to form further condensed rings.

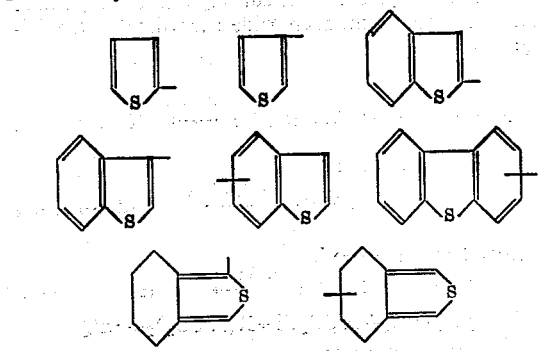

If the group CH=C—SH or CH=C—OH falls in the thiophene nucleus, a proton shift will probably occur, resulting in —CH₂—C=S or —CH₂—C=O. When, however, the —SH or —OH is on an aromatic nucleus, no such shift will occur.

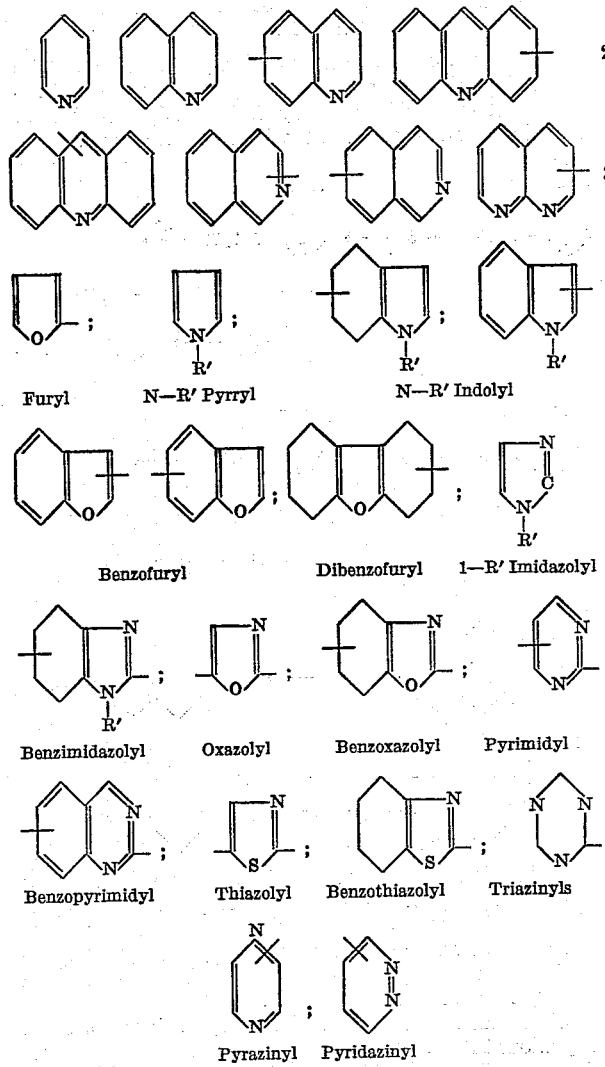

Furyl    N—R' Pyrryl    N—R' Indolyl

Benzofuryl    Dibenzofuryl    1—R' Imidazolyl

Benzimidazolyl    Oxazolyl    Benzoxazolyl    Pyrimidyl

Benzopyrimidyl    Thiazolyl    Benzothiazolyl    Triazinyls

Pyrazinyl    Pyridazinyl (B) *Reaction with sulfur dioxide, thionyl chloride, sulfur oxychloride, sulfuryl chloride, sulfonyl chlorides, sulfur dichloride and sulfur monochloride.*—Heterocyclic magnesium chloride reagents, RMgCl·nQ, as defined above react with sulfur dioxide, thionyl chloride, sulfuryl chloride, sulfonyl chlorides, sulfur dichloride and sulfur monochloride generally according to Reactions 7 through 12, wherein R' is defined as above, for those reactions.

VINYL MAGNESIUM CHLORIDE REAGENTS

In this application, the term "vinyl" radical refers to the vinyl group or to substituted vinyl groups. Thus, a vinyl chloride has the general formula:

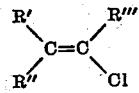

where R', R" and R''' may be the same or different and may be hydrogen or any hydrocarbon group, aliphatic or aromatic; they may also be hydrocarbon groups with functional group substituents, provided that the latter are inert to vinyl magnesium chloride; R' may cyclicize with R" or R''', as, for example, in the compound $$CH_2—CH=C—Cl$$
$$CH_2—CH_2—CH_2$$

furthermore, R''' may also be chlorine, in which case the magnesium may react with one or both chlorines.

When the formula RMgCl·nQ is used in this application to refer to a vinyl magnesium chloride, then R represents the group

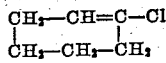

where R', R" and R''' are as defined above.

Similarly, in a vinyl dimagnesium chloride reagent, R(MgCl)₂·nQ, R represents the bivalent group

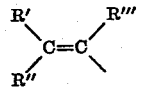

(A) *Reactions with sulfur and oxygen.*—Vinyl magnesium chloride reagents, RMgCl·nQ, as defined above, react with sulfur and oxygen according to Reactions 3 and 4 with an added proton shift. Thus, in the reaction with oxygen the end product is an aldehyde or ketone as illustrated by the following reactions:

(26)    $CH_2=CHMgCl \cdot nQ + O \rightarrow CH_2=CHOMgCl + \cdot nQ$ (26a)
$$CH_2=CHOMgCl \xrightarrow{H_2O} [CH_2=CHOH] \longrightarrow CH_3CHO$$
$$\text{unstable enol}$$

(27)    $CH_2=CR'''MgCl \cdot nQ + O \rightarrow CH_2=CR'''OMgCl$ (27a)    $CH_2=CR'''OMgCl \xrightarrow{H_2O} CH_3(R''')C=O$ where R''' is a hydrocarbon group or a substituted hydrocarbon group as in the definition of vinyl chloride above.

In the reaction with sulfur it is possible to prepare vinyl mercaptides by omitting the hydrolysis step and reacting instead with a metal salt, as follows:

(28)    $CH_2=CHMgCl \cdot nQ + S \rightarrow CH_2=CHSMgCl + nQ$ (28a)    $CH_2=CHSMgCl + MX \rightarrow CH_2=CHSM + MgClX$ wherein M is a metal and X is a halogen; or more specifically:

(28b)    $2CH_2=CHSMgCl + R_2SnCl_2 \rightarrow R_2Sn(SCH=CH_2)_2$ where R' is a hydrocarbon group.

Elemental selenium and tellurium may replace sulfur in these reactions.

(B) *Reactions with sulfur dioxide, thionyl chloride, sulfuryl chloride, sulfonyl chlorides, sulfur dichloride and sulfur monochloride.*—Vinyl magnesium chloride reagents, RMgCl·nQ, as defined above, react in this case according to Reactions 7 through 12.

The following examples are further illustrative of the present invention. It is to be understood, however, that the present invention is not restricted thereto.

All the following examples are carried out under an atmosphere of dry, oxygen-free nitrogen.

Example 1

To one mole of phenylmagnesium chloride-tetrahydrofuran complex in excess tetrahydrofuran is slowly added a suspension of flowers of sulfur (32 grams, one g. atom) in 200 ml. of tetrahydrofuran. The mix is stirred and kept at reflux during the addition. It is heated for 4 to 6 hours after the addition is complete, then cooled, and added to a cold dilute aqueous acid (HCl or $H_2SO_4$) solution. (About 400–500 ml. containing 1.2 equivalent.) The organic layer is separated, the aqueous layer extracted twice with toluene, the extracts combined with the organic layer, and the solvents stripped off by vacuum distillation (at 100–200 mm. Hg). The residue is filtered and distilled under vacuum to yield thiophenol, B. 54–57° C. 10 mm.

Yield of thiophenol can be improved by treating the residue before vacuum distillation by the usual reducing agents, such as zinc and acetic acid, to destroy the S—S multiple linkages found in the by-products of this preparative method.

Example 2

Air, freed of carbon dioxide by passing through soda-lime and dried by passing through concentrated sulfuric acid and then calcium sulfate (Drierite), is bubbled slowly into a solution of phenylmagnesium chloride-complex in tetrahydropyran for several hours until a negative Gilman color test I is obtained. This test is done by adding 1 ml. of the mix to 1 ml. of a benzene (dry) solution of Michler's ketone, then adding water, and finally adding iodine in acetic acid. A positive test is a greenish color.

After the negative test is obtained the solution is heated to reflux, air passage is stopped, and a small amount of phenylmagnesium chloride is added until a positive Gilman test is obtained. This last addition is to make certain peroxides are used up. The solution is cooled and added to acidified cool water (400 ml. (containing 1.2 moles of HCl) per 1 mole of original phenylmagnesium chloride). The layers are separated and phenol is recovered by stripping off of solvent and distillation.

Example 3

Sulfur dioxide is bubbled into a solution of phenylmagnesium chloride complex in methyltetrahydrofuran until a negative Gilman color test results. The solution is then adde to 400 ml. of cool water. The organic layer is removed and the aqueous solution is treated with barium chloride and ethyl alcohol to precipitate barium benzene sulfinate. By treatment of the barium benzenesulfinate with the calculated amount of cold sulfuric acid solution, filtration, and vacuum evaporation of water, benzenesulfinic acid crystals are obtained.

Example 4

Thionyl chloride (0.5 mole) is added dropwise to a solution of one mole of phenylmagnesium chloride-complex in tetrahydrofuran with cooling and stirring. After completion of addition, the mix is heated to reflux for 2 or 3 hours, cooled, and added to 400 ml. of acidified water. The organic layer is stripped of solvent and the diphenylsulfoxide product is purified by recrystallization from heptane.

Example 5

Sulfuryl chloride (0.5 mole) is added slowly to a cooled solution of one mole of phenylmagnesium chloride-complex in tetrahydrofuran with stirring. After addition is complete, the mix is heated to reflux for 2 or 3 hours, cooled, and added to acidified water. The organic layer is stripped of solvent and the diphenyl sulfone product is purified by recrystallization from alcohol.

Example 6

Benzenesulfonyl chloride (1.0 mole) and phenylmagnesium chloride-complex (1 mole) used in the process of Example 5 yield diphenyl sulfone.

Example 7

Sulfur dichloride (0.5 mole) is added dropwise to a cooled, stirred solution of phenylmagnesium chloride-complex (1 mole) in tetrahydrofuran. After addition is completed, the mixture is heated to reflux for 2 hours, cooled, and added to 400 ml. of acidified water. The organic layer is separated, the solvent removed by distillation, and the product, diphenyl sulfide, purified by vacuum distillation.

Example 8

Sulfur monochloride (0.5 mole) is added slowly to a cooled, stirred solution of phenylmagnesium chloride-complex (1 mole) in tetrahydrofuran. As soon as the addition is complete, the mixture is heated to reflux, heated at reflux for 2 hours, cooled, and added to 400 ml. of acidified water. The organic layer is separated, stripped of solvent by distillation, and the product, diphenyl disulfide, purified by recrystallization from benzene.

Example 9

By the process of Example 2, vinylmagnesium chloride yields acetaldehyde.

Example 10

By the process of Example 4, vinylmagnesium chloride yields divinyl sulfoxide.

Example 11

By the process of Example 6, vinylmagnesium chloride and p-toluenesulfonyl chloride yield vinyl p-tolyl sulfone.

Example 12

By the process of Example 7, vinylmagnesium chloride yields divinyl sulfide.

Example 13

By the process of Example 8, vinylmagnesium chloride yields divinyl disulfide.

Example 14

By the process of Example 7, p-chlorophenylmagnesium chloride-complex yields di-p-chlorophenyl sulfide.

Example 15

By the process of Example 5, di-p-chlorophenylmagnesium chloride yields di-p-chlorophenyl sulfone.

Example 16

By the process of Example 6, p-chlorophenylmagnesium chloride yields phenyl-p-chlorophenyl sulfone.

Example 17

By the process of Example 1, ortho tolylmagnesium chloride yields o-thiocresol.

Example 18

By the process of Example 7, m-tolylmagnesium chloride complex yields di-m-tolyl sulfide.

Example 19

By the process of Example 7, p-tolylmagnesium chloride yields di-p-tolyl sulfide.

Example 20

By the process of Example 2, p-anisylmagnesium chloride yields the monomethyl ether of hydroquinone.

Example 21

By the process of Example 5, p-anisylmagnesium chloride yields di-p-anisyl sulfone.

Example 22
By the process of Example 1, p-phenetylmagnesium chloride yields p-ethoxythiophenol.

Example 23
Dichlorophenylmagnesium chloride by the process of Example 1, yields dichlorothiophenol.

Example 24
Trichlorophenylmagnesium chloride in the process of Example 2, yields trichlorophenol.

Example 25
Tetrachlorophenylmagnesium chloride in the process of Example 7, yields di-tetrachlorophenyl sulfide.

Example 26
Pentachlorophenylmagnesium chloride and p-toluenesulfonyl chloride, in the process of Example 6, yield pentachlorophenyl-p-tolyl sulfone.

Example 27
Use of 2-m-xylylmagnesium chloride in the process of Example 2, yields 2, 6 dimethylphenol.

Example 28
By the process of Example 3, 2-m-xylylmagnesium chloride yields 2,6 dimethylphenylsulfinic acid.

Example 29
By the process of Example 2, p-biphenylylmagnesium chloride yields p-phenylphenol.

Example 30
Trichlorobiphenylylmagnesium chloride in the process of Example 1, yields mercaptotrichlorobiphenyl.

Example 31
Nonachlorobiphenylylmagnesium chloride used in the process of Example 3, yields nonachlorobiphenylsulfinic acid.

Example 32
By the process of Example 1, α naphthylmagnesium chloride yields α thionaphthol.

Example 33
By the process of Example 2, β naphthylmagnesium chloride yields β-naphthol.

Example 34
By the process of Example 2, o-trifluoromethylphenylmagnesium chloride yields o-trifluoromethylphenol.

Example 35
By the process of Example 5, p-dimethylaminophenylmagnesium chloride yields bis-p-dimethylaminophenyl sulfone.

Example 36
By the process of Example 7, p-dimethylaminophenylmagnesium chloride yields bis dimethylaminophenyl sulfide.

Example 37
By the process fo Example 3, p-dimethylaminophenylmagnesium chloride yields p-dimethylaminobenzenesulfinic acid.

Example 38
Diethylaminophenylmagnesium chloride in Example 37, yields p-diethylaminophenylsulfinic acid.

Example 39
Diethylaminophenylmagnesium chloride used in Example 1, yields p-diethylaminothiophenol.

Example 40
Chlorotolylmagnesium chloride (from 2,4 dichlorotoluene) in Example 1, yields chlorothiocresol.

Example 41
Used in Example 5, chlorotolylmagnesium chloride yields bis chlorotolyl sulfone.

Example 42
Chloroanisylmagnesium chloride (from 2,4- dichloroanisole) used in the process of Example 7, yields bis chloroanisyl sulfide.

Example 43
Chlorophenetylmagnesium chloride in Example 42, yields bis chlorophenethyl sulfide.

Example 44
Ethyltetrachlorophenylmagnesium chloride in the process of Example 1, yields ethyltetrachlorothiophenol.

Example 45
By the process of Example 3, α-thienylmagnesium chloride yields α-thienyl sulfinic acid.

Example 46
By the process of Example 4, α-thienylmagnesium chloride yields bis α-thienyl sulfone.

Example 47
With p-toluenesulfonyl chloride in the process of Example 6, α-thienylmagnesium chloride yields α thienyl p-tolyl sulfone.

Example 48
Use of α thienylmagnesium chloride in the process of Example 7, yields bis α thienylsulfide.

Example 49
By the process of Example 2, 2 pyridylmagnesium chloride yields 2 pyridone.

Example 50
Furylmagnesium chloride, by the process of Example 7, yields bis furyl sulfide.

Example 51
By the process of Example 4, 5 chloro-2-thienylmagnesium chloride yields bis 5-chloro-2-thienyl sulfone.

Example 52
By the process of Example 7, 5 chloro-2-thienylmagnesium chloride yields bis 5-chloro-2-thienyl sulfide.

Example 53
By the process of Example 1, m-fluorophenylmagnesium chloride yields m-fluorothiophenol.

Example 54
By the process of Example 7, m-fluorophenylmagnesium chloride yields bis m-fluorophenyl sulfide.

Example 55
Difluorophenylmagnesium chloride in the process of Example 1, yields difluorothiophenol.

Example 56
Trifluorophenylmagnesium chloride in the process of Example 2, yields trifluorophenol.

Example 57
By the process of Example 7, pentafluorophenylmagnesium chloride yields bispentafluorophenyl sulfide.

Example 58
By the process of Example 2, 2-benzothiazolylmagnesium chloride yields 2-hydroxybenzothiazole.

Example 59
By the process of Example 1, 2-benzothiazolylmagnesium chloride yields 2-mercaptobenzothiazole.

Example 60
By the process of Example 7, 2-benzothiazolylmagnesium chloride yields bis-2-benzothiazolyl sulfide.

Example 61
By the process of Example 8, 2-benzothiazolylmagnesium chloride yields bis-2 benzothiazolyl disulfide.

Example 62
By the process of Example 1, 2-benzoxazolylmagnesium chloride yields 2 mercaptobenzoxazole.

Example 63
By the process of Example 2, 2-methyl-5-benzothiazolylmagnesium chloride yields 2-methyl-5-hydroxybenzothiazole.

Example 64
By the process of Example 7, 2-quinolylmagnesium chloride yields bis-2-quinolyl sulfide.

Example 65
By the process of Example 2, 6 quinolylmagnesium chloride yields 6 hydroxyquinoline.

Example 66
By the process of Example 2, 8-quinolylmagnesium chloride yields 8 hydroxyquinoline.

Example 67
By the process of Example 3; 4,5,6 trichloropyrimidylmagnesium chloride yields 4,5,6 trichloropyrimidylsulfinic acid.

Example 68
By the process of Example 4, 1 cyclohexenylmagnesium chloride yields bis-1 cyclohexenyl sulfone.

Example 69
By the process of Example 7, 4 methyl-1-penten-2-yl-magnesium chloride yields bis 4-methyl-1-penten-2-yl sulfide.

Example 70
By the process of Example 5, 2 propen-2-ylmagnesium chloride yields bis 2-propen-2-yl sulfone.

Example 71
By the process of Example 6, 1 propen-1-ylmagnesium chloride yields phenyl 1-propen-1-yl sulfone.

Example 72
By the process of Example 8, 2 buten-2-ylmagnesium chloride yields bis-2-buten-2-yl disulfide.

Example 73
By the process of Example 6, 1 buten-1-ylmagnesium chloride yields phenyl-1 buten-1-yl sulfone.

Example 74
By the process of Example 7, N methylpyrrylmagnesium chloride yields bis-N-methylpyrryl sulfide.

Example 75
By the process of Example 2, 4 vinylphenylmagnesium chloride yields 4-vinylphenol.

Example 76
By the process of Example 2, 3-p-cymenylmagnesium chloride (from 3 chloro-p-cymene) yields thymol.

Example 77
By the process of Example 1, phenylmagnesium chloride and selenium powder in place of sulfur yield phenylhydroselenide.

Example 78
By the process of Example 1, phenylmagnesium chloride and tellurium powder in place of sulfur yield phenylhydrotelluride.

Throughout the application it is specified that the reactive compond is $RMgCl \cdot nQ$. This is also in the equations illustrative of the process and of the materials used in the examples. It is necessary that the RMgCl compound be formed in the presence of compound Q. However, the process of the present invention is not dependent upon RMgCl being present in the form of the Q complex ($RMgCl \cdot nQ$). The illustrative equations herein may also be written with RMgCl in place of $RMgCl \cdot nQ$ and could be read with RMgCl as an alternative reactant to $$RMgCl \cdot nQ$$

The processes of this application can be used to produce, economically, chemicals which are already articles of commerce.

They also provide means for introducing unusual substituents into known compounds. These substituents alter profoundly the physical, and sometimes the chemical properties of the compounds, greatly increasing their field of usefulness. Many of the compounds so formed are entirely new, while others, although known, never reached commercial acceptance because previous methods of manufacture were too expensive.

The versatility of the processes makes it possible to "tailor make" chemicals for specific applications, especially when aryl, heterocyclic or vinyl groups are needed.

These compounds with vinyl groups are useful as polymerization monomers and comonomers. Those with two vinyl groups are useful as cross-linking comonomers for polyesters, and other vinyl polymerizations.

The phenols are useful as germicidal agents, as insecticides, and as fungicidal impregnants for wood (to prevent rot and deterioration) and as general fungicides. Many are intermediates for preparing substituted phenoxyacetic acids (used as weed and brush killers).

The mercapto compounds are useful as stabilizer intermediates, being convertible to dibutyltin dimercaptides, stabilizers for polyvinyl chloride resins; as antioxidants for rubber and lube oils; as odorants; and as intermediates to prepare fungicides.

The sulfinic acids are useful as antioxidants, as intermediates with, for example, dibutyltin oxide to prepare stabilizers for polyvinyl chloride.

The sulfones (in particular chlorophenyl phenyl sulfone) and sulfoxides are useful as insecticides. Other uses include rubber stabilizers, oil additives as detergents and pour point depressants, and as chemical intermediates.

The sulfides and disulfides are useful as rubber antioxidants and also as vulcanization accelerators, as ingredients in lube oils, and in fungicidal compositions.

While the invention has been described with particular reference to specific embodiments, it is to be understood that it is not limited thereto but is to be construed broadly and restricted solely by the scope of the appended claims.

What is claimed is:

1. A process which comprises reacting vinylmagnesium chloride, said vinylmagnesium chloride being prepared by reacting vinyl chloride with magnesium in compound Q, with a material selected from the class consisting of sulfur dioxide, thionyl chloride, sulfuryl chloride, benzene sulfonyl chloride, p-toluene-sulfonyl chloride, sulfur dichloride, and sulfur monochloride in compound Q, and subsequently hydrolyzing the reaction product; wherein Q is selected from the class consisting of tetrahydrofuran, tetrahydropyran, 2-ethoxy tetrahydropyran, dihydropyran, tetrahydrofurfuryl ethyl ether and 2-methyl tetrahydrofuran.

2. A process according to claim 1 in which Q is tetrahydrofuran.

3. A process according to claim 1 in which Q is tetrahydropyran.

4. A process according to claim 1 in which Q is 2-methyl tetrahydrofuran.

References Cited in the file of this patent

Fieser et al.: Org. Chem., Reinhold Publ. Co., 1950, p. 135.

Kharasch: Grignard Reactions of Non-Metallic Substance, 1954, pp. 1264–1305.

Helv. Chim. Acta, vol. 26 (1943), pp. 2251–52.